United States Patent [19]

Dunnery et al.

[11] 4,122,149
[45] Oct. 24, 1978

[54] PROCESS FOR REMOVING SO₂ FROM EFFLUENT GASES AND FOR REMOVING HEAT STABLE SALTS FROM SYSTEMS IN WHICH THEY ACCUMULATE

[75] Inventors: David Arthur Dunnery, New York; Joseph Edmund Sokolik, Jr., Tarrytown; Gilbert Richard Atwood, Briarcliff Manor; Alexander Jean-Marie Kosseim, Yorktown Heights, all of N.Y.

[73] Assignee: Union Carbide Corporation, New York, N.Y.

[21] Appl. No.: 781,175

[22] Filed: Mar. 25, 1977

[51] Int. Cl.² .............................................. C01B 17/00
[52] U.S. Cl. ...................................... 423/242; 423/243
[58] Field of Search .............................. 423/242–244, 423/512 A, 512 R

[56] References Cited
U.S. PATENT DOCUMENTS

| | | | |
|---|---|---|---|
| 2,713,077 | 7/1955 | Rieve | 423/242 |
| 3,330,621 | 7/1967 | Viar-Ortuno et al. | 423/242 |
| 3,477,815 | 11/1969 | Miller et al. | 423/242 X |
| 3,485,581 | 12/1969 | Miller | 423/242 X |
| 3,879,521 | 4/1975 | Anderson | 423/512 X |
| 3,896,214 | 7/1975 | Newman | 423/242 |

OTHER PUBLICATIONS

Amberlyst Technical Notes, Jun. 1969, p. 3.

Primary Examiner—O. R. Vertiz
Assistant Examiner—Gregory A. Heller
Attorney, Agent, or Firm—Dominic J. Terminello

[57] ABSTRACT

Improvement in processes for the selective removal of sulfur dioxide with respect to carbon dioxide from a gas mixture containing same wherein the gas mixture is contacted with an aqueous absorbent solution, such as an alkanolamine, an alkali metal or ammonium hydroxide, or sulfites thereof, to remove sulfur dioxide from the gas mixture and form a $SO_2$-rich aqueous absorbent solution which is moved to a stripping zone where sulfur dioxide is driven off to form a $SO_2$-depleted aqueous absorbent solution which is recycled and re-contacted with the gas mixture, the improvement comprising removing sulfur oxyanions of heat stable salts which accumulate in the aqueous absorbent solution by contacting it with an anion exchange resin having bisulfite anions displaceable by the heat stable sulfur oxyanions whereby the bisulfite anions of the resin are replaced by the heat stable divalent sulfur oxyanions which are thus taken out of the solution. The anion exchange resin preferably is a weak base anion exchange resin which can be regenerated by contacting it with aqueous ammonium hydroxide to replace the heat stable sulfur oxyanions on said resin with hydroxyl anions and thereafter contacting the resin with aqueous-sulfur dioxide to replace the hydroxyl anions with bisulfite anions.

16 Claims, 1 Drawing Figure

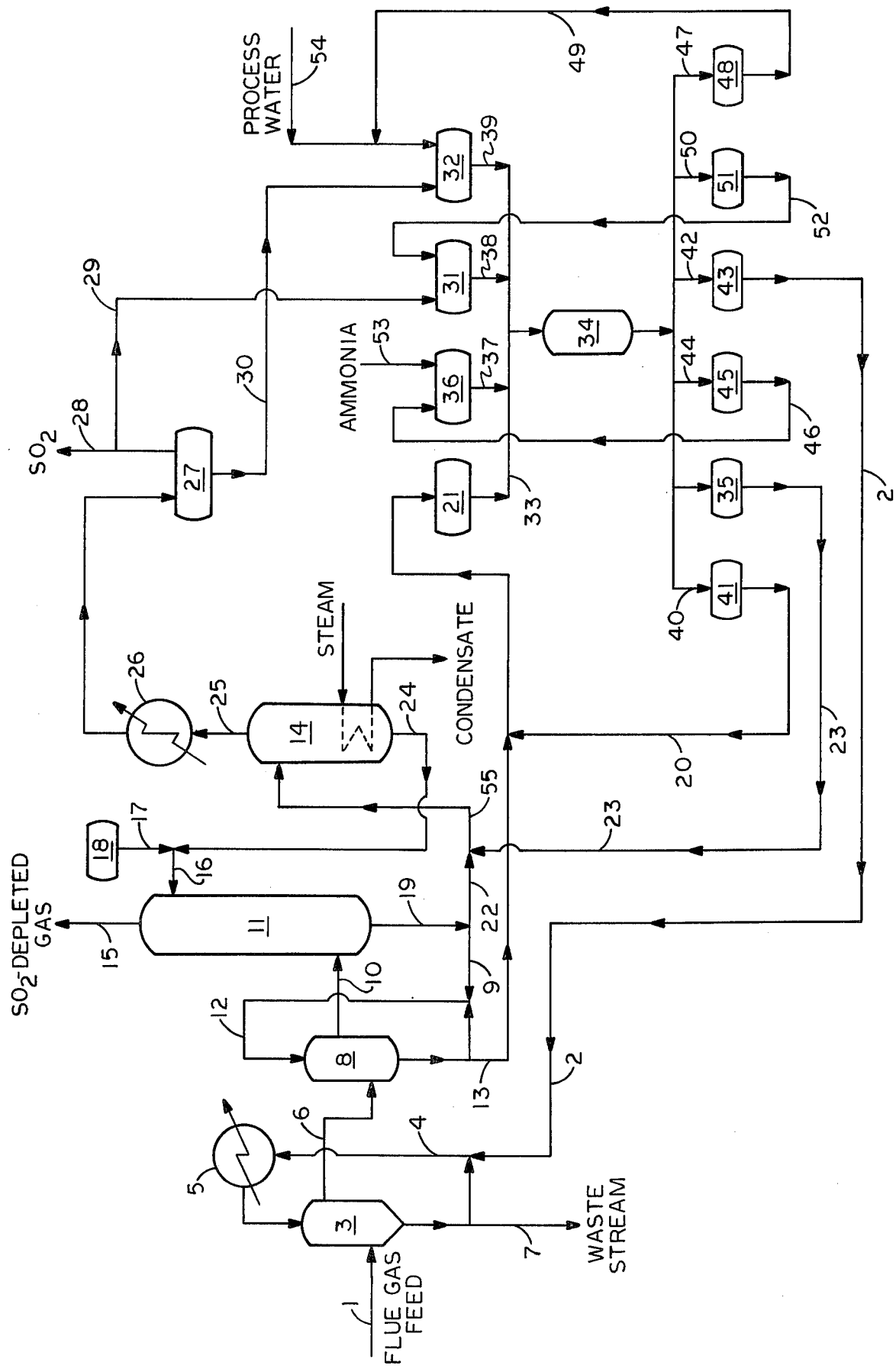

PROCESS FOR REMOVING SO₂ FROM EFFLUENT GASES AND FOR REMOVING HEAT STABLE SALTS FROM SYSTEMS IN WHICH THEY ACCUMULATE

BACKGROUND OF THE INVENTION

1. Field of the Invention

This invention relates to novel processes for removing sulfur oxides from gas mixtures containing same as in the removal of sulfur oxides from combustion waste gases, or stack gases of electric power plants, pyrites roasting processes, smelters, sulfuric acid plants, off-gases from incinerators, and off-gases from other chemical procedures. More generally, the invention relates to the removal of heat stable salts containing heat stable, divalent, sulfur oxyanions from systems in which they accumulate.

2. Description of the Prior Art

The use of sulfur-containing fossil fuels as power sources results in effluent gases containing a number of noxious environmental pollutants, chief among which are sulfur dioxide and sulfur trioxide. A number of solutions for this problem have been proposed which involve absorbing and/or reacting the sulfur oxides with inorganic reagents, e.g., sodium carbonate, sodium hydroxide, ammonium hydroxide, aqueous ammonia, other alkali metal or alkaline earth metal hydroxides or carbonates and the like, in solution, slurry or powder form to yield the corresponding sulfate and sulfite salts.

In many of these processes, the absorbing solutions are regenerated by heating, in a separate vessel, thus liberating concentrated SO₂ (see, for example, U.S. Pat. No. 1,908,731). This desorption step does not, however, remove any sulfate, thiosulfates or polythionates that result from absorption of the sulfur trioxide and thermal disproportionation of sulfite and bisulfite and which eventually build up in the system.

In many of theses cases, the reagent cannot be readily regenerated without the expenditure of considerable amounts of energy or considerable amounts of other reagents. In those instances where a regenerated absorbent can be used, the sulfate concentrations in the absorbent build up both by absorption of sulfur trioxide or sulfuric acid mist which might be and usually are present in the stack gas and by oxidation of dissolved sulfur dioxide by the reaction of oxygen which is also sometimes present in the stack gas. A further source of the build up of sulfates or other sulfur oxyanions of heat stable salts is disproportionation of dissolved sulfites and bisulfites in contact with dissolved sulfur dioxide. Such heat stable salts include, in addition to the sulfates, $SO_4^=$; the thiosulfates, $S_2O_3^=$; the dithionates, $S_2O_6^=$; the trithionates, $S_3O_6^=$; and other higher polythionates, $S_xO_6^=$, and other divalent sulfur oxyanion-containing heat stable salts. The sulfates usually can be removed essentially quantitatively through the use of an alkali metal hydroxide equivalent to twice the molar concentration of the sulfate resulting in substantially quantitative precipitation of the sulfate as the di-alkali metal salt without precipitation of sulfite or bisulfite ions. However, the other divalent sulfur oxyanions of strong acids such as the thiosulfates, dithionates and higher polythionates also build up in the system and cannot be quantitatively removed by means of alkali metal hydroxide precipitation. Furthermore, the presence of such other divalent sulfur oxyanions of heat stable salts actively interfere with the quantitative removal of the sulfates.

In some instances, as in U.S. Pat. No. 3,503,185, the combustion waste gas was prewashed to remove sulfates which were then purged from the system. Such prewashes were not capable of removing all sulfur trioxide as sulfate and, of course, would not remove sulfates formed in other parts of the system. This patent, furthermore, does not disclose any means for eliminating the thiosulfates, dithionates and higher polythionates. U.S. Pat. No. 3,790,660 is similar in showing a water prewash to remove sulfur trioxide and fly ash. It specifies a sulfate purge stream to remove the sulfate; unfortunately, a considerable amount of the alkali metal sulfite and bisulfite also accompany the sulfate. This requires a considerable addition of alkali metal hydroxide to make up for the loss. Furthermore, there is no system disclosed for removing the thiosulfates, dithionates or other polythionates except by purging them with the sulfate in a waste stream. The waste stream itself is relatively dilute and poses a pollution problem in disposing of it which it difficult and expensive to handle.

There are prior processes which utilize H₂S, itself a noxious gas, to react with sulfur oxides which are dissolved in solvents, such as alkali metal bisulfites, ammonium bisulfite, aqueous ammonia or ammonium sulfite. These prior processes are disclosed in U.S. Pat. Nos. 3,561,925; 3,598,529; 3,719,742; 3,833,710 and 3,839,549. These patents do not specifically address the problem of removing sulfates and other heat stable salts which build up or accumulate during removal of sulfur dioxide. U.S. Pat. No. 3,883,638 teaches a process which uses H₂S to react with ammonium bisulfite to form SO₂, NH₃ and water. H₂S in some cases is not readily available and can be difficult to store and handle and can itself possibly lead to pollution problems.

The use of alkanolamines, such as trialkanolamines, has been found to be a highly efficient way of absorbing sulfur dioxide from waste gases in a cycle in which the alkanolamine solvent contacts the waste gas to absorb the sulfur oxides and is thereafter stripped by heat to release the sulfur dioxide as a gas whereupon it is collected for safe disposal. The stripped alkanolamine is then recycled back to the absorber for further contact with incoming waste gases and further absorption of sulfur oxide. This type of system is disclosed in U.S. Pat. Nos. 3,620,674 and 3,904,735. Heat stable salts, such as those mentioned hereinabove, accumulate in the recycling absorbent to a troublesome extent and must be removed in order to maintain the absorbing capability of the absorbent. The latter patent does disclose a sulfate purge cycle in which a portion of the lean absorbent is treated with potassium hydroxide or potassium carbonate to precipitate out the sulfate as potassium sulfate. While this type of purge system is quite effective in removing sulfates, it is severely limited in removing other heat stable salts or their divalent sulfur oxyanions, which also seem to interfere, however, with the sulfate removal. Furthermore, large amounts of wet sulfates are produced and create a severe disposal problem. There does not appear to be any provisions made in U.S. Pat. No. 3,620,674 for removing the heat stable salts and/or their sulfur oxyanions from the absorbent which gradually but inevitably loses effectiveness because of the accumulation of heat stable salts therein.

Anion exchange resins have been used in the past to separate sulfur dioxide from waste gas mixtures. An example of prior art of this type is U.S. Pat. No. 3,330,621 which utilizes a mass of solid pyridine group-containing particles to contact the sulfur dioxide-containing gas to bind the sulfur dioxide as sulfite groups to the pyridine groups. Thereafter, oxygen is added to oxidize the sulfite groups on the pyridine groups to form sulfate groups. Then, the sulfate groups on the pyridine groups are treated with ammonia to form ammonium sulfate which is then recovered and the pyridine group-containing particles are recycled for re-contact with the waste gases. This type of prior art process involves the use of extremely high quantities of anion exchange resin and excessively large quantities of ammonia and/or other reagents and presents a disposal problem for the large quantities of ammonium sulfate which are produced because the total quantity of sulfur dioxide in the waste gas is converted via the pyridine group-containing particles into ammonium sulfate.

Anion exchange resins have also been used to treat the total amount of a recycling absorbent, such as sodium hydroxide or ammonium bisulfite. In U.S. Pat. No. 3,896,214, the sulfur dioxide and sulfur trioxide in the waste gases are washed with sodium hydroxide to convert substantially all the sulfur dioxide and sulfur trioxide content thereof into sodium bisulfite and/or sodium sulfite and sodium sulfate which are then contacted with a hydroxyl-containing weak base or strong base anion exchange resin to substitute the hydroxyl groups on the resin with the bisulfite, sulfite and sulfate anions thereby regenerating the sodium hydroxide. The resulting resin sulfate, sulfite and/or bisulfite is regenerated by treatment with aqueous lime hydrate to form calcium sulfate and calcium sulfite and/or calcium bisulfite and to substitute hydroxyl anions on the resin. The calcium salts are removed as a sludge by dewatering. In U.S. Pat. No. 3,833,710, aqueous ammonium sulfite is used as an absorbent and is converted to aqueous ammonium bisulfite after picking up the sulfur dioxide in the waste gas. The aqueous ammonium bisulfite solution is contacted with a weak base anion exchange resin in the hydroxyl form to convert the resin to the bisulfite form and regenerate the ammonium sulfite absorbent solution. Both this and U.S. Pat. No. 3,896,214 are based on the removal from the waste gases of the total amount of the $SO_2$ content as well as the $SO_3$ content by utilizing ion exchange. This requires the utilization of extremely large amounts of anion exchange resins which are expensive and also requires the use of extremely large amounts of reagents to regenerate the anion exchange resin which is not only expensive but presents a considerable waste disposal problem for liquid wastes that are relatively quite dilute when consideration is given to the need for washing the resin after each liquid pass during regeneration.

U.S. Pat. No. 2,713,077 discloses the use of strong base anion exchange resins to remove carbonyl sulfides from hydrocarbon fluids, such as hydrocarbon gases, produced by the thermal or catalytic cracking of petroleum oils or by the reaction of steam with coke or hydrocarbons. U.S. Pat. No. 3,297,401 removes arsenic and iron contamination from phosphoric acid preparations with a weak base liquid anion exchange resin. In each of these patents the spent anion exchange resin can be regenerated with sodium hydroxide. Neither patent relates to the removal of sulfur dioxide and heat stable salts from waste gases containing them or their ingredients.

SUMMARY OF THE INVENTION

The present invention provides improvements in processes designed for the selective removal of sulfur dioxide with respect to carbon dioxide from a gas mixture containing same wherein (a) the gas mixture is contacted with an aqueous absorbent solution containing as an absorbent an alkanolamine, an alkali metal hydroxide, ammonium hydroxide, an alkanolamine sulfite, an alkali metal sulfite or ammonium sulfite to remove sulfur dioxide from said gas mixture and form a rich aqueous absorbent solution enriched in sulfur dioxide removed from the gas mixture, (b) the rich aqueous absorbent solution is moved to a stripping zone where sulfur dioxide is removed to form a lean aqueous absorbent solution depleted in sulfur dioxide content, and (c) the lean aqueous absorbent solution is recycled and re-contacted with said gas mixture.

Processes of this type to which the improvement of this invention can be adapted are known in the art and are illustrated by U.S. Pat. Nos. 3,904,735 incorporated herein by reference and 3,620,674 which describe processes utilizing alkanolamines or sulfites thereof as absorbents; 3,790,660 and 3,719,742 which respectively use sodium sulfite and potassium sulfite; 3,833,710 which uses ammonium sulfite; 3,503,185, 3,561,925, 3,839,549 and 3,883,638 which use aqueous ammonia or ammonium hydroxide and 3,896,214 which uses sodium hydroxide as absorbent. The improvement of this invention relates to the removal of divalent sulfur oxyanions of heat stable salts which accumulate in the aqueous absorbent solution, and comprises the step of contacting the aqueous absorbent solution with an anion exchange resin having bisulfite anions displaceable by the divalent sulfur oxyanions of the heat stable salts to remove same from the aqueous absorbent solution whereby the bisulfite anions of the resin are replaced by the divalent sulfur oxyanions of the heat stable salts.

The present invention is based upon the ability of bisulfite anions of an anion exchange resin containing them to be displaced by heat stable divalent sulfur oxyanions which thus become bonded to the resin. The displaced bisulfite anions are unstable to heat, decomposing when heated to release sulfur dioxide. The present invention provides the further advantage that the anion exchange resin in the bisulfite form selectively exchanges anions with the heat stable salts but not with aqueous sulfur dioxide or its product of dissolution, the bisulfite ion, $HSO_3^-$. This permits the selective removal of heat stable salt anions without wasting ion exchange capacity and regenerant costs on aqueous sulfur dioxide or bisulfite ion removal.

These discoveries are used by the present invention to treat a slip stream, or purge stream, of an aqueous $SO_2$-absorbent, such as aqueous triethanolamine or its sulfite or bisulfite, with an anion exchange resin in the bisulfite form after the aqueous absorbent has been used to treat combustion waste gases containing sulfur dioxide which is absorbed thereby. The absorbent is thereafter regenerated by heating in an evaporator or still or other suitable stripping apparatus and recycled for further contact with combustion waste gases containing sulfur dioxide. In this way, the waste gases are depleted in sulfur dioxide content. However, heat stable salts and/or the divalent sulfur oxyanions thereof form in the system, or enter it with the waste gases, and build up to the point where the absorbent no longer functions efficiently and becomes less capable of absorbing sulfur dioxide.

Ion exchange has been defined as the reversible exchange of ions between a solid and a liquid in which there is no substantial change in the structure of the solid. Anion exchange resins are high molecular weight polybases containing large numbers of polar exchange groups that are chemically bound to a three-dimensional hydrocarbon network. Anion exchangers usually contain primary, secondary and tertiary amine groups, and quaternary ammonium groups. However, sulfonium anion exchangers have been made and phosphonium anion exchangers are feasible. The mode of operation of anion exchange resins is the same as a solution phase reaction, with the exception that one of the ionic species is permanently fixed to the resin bead itself, and the reaction is shifted back and forth by strong concentration differences of the various solutions used.

The three-dimensional hydrocarbon network to which the polar exchange groups are bound usually is of a polymeric nature. Polystyrene crosslinked with divinylbenzene to provide the needed or desired dimensional stability is most frequently used although other polymeric forms, such as the acrylics and other vinyl polymers, are used or are available, for example, phenol-formaldehyde resins have been widely used. The polar groups are bonded to the resin or polymer, usually, by a procedure involving chloromethylation and amination. The physical form of the anion exchangers is preferably a bead form as is obtained by suspension or dispersion polymerization of styrene and divinylbenzene, although other particle forms are used, for example, granulated phenol-formaldehyde resins.

Commercial anion exchange resins are available in two major types, macroreticular and "gel" types. The macroreticular resins are small, tough, rigid plastic beads having large discrete pores in the range of 1300 A. Because of their large uniform pore structure, these resins are useful for the absorption and elution of high molecular weight ions and have good hydraulic characteristics. Furthermore, because of their tough structure (they have a higher degree of crosslinking), they are less susceptible to physical attrition and have a long operating life. They do, however, have somewhat lower capacity than the "gel" resins. The latter do not contain any true porosity (and usually have a much lower degree of crosslinking) and the ions to be exchanged must "diffuse" through the gel structure, thus limiting the size of the ions that can be handled. The advantage to this type of resin is its higher exchange capacity and somewhat lower capital cost.

Both of these two major types are broken down into two sub-groups: The strongly basic anion exchangers with quaternary ammonium functionality and the weakly basic anion exchangers with polyamine functionality. The strong base resins offer much better removal of anions in the exhaustion step whereas the weak base resins offer greater ease of regeneration.

Suitable anion exchange resins for use in this invention include the strong base and weak base anion exchange resins capable of containing bisulfite anions as the anion component. Preferred anion exchange resins are the styrene-divinylbenzene copolymers, usually in bead form. The weak base exchangers have polyamine functionality and are preferred. Macroreticular weak base anion exchange resins, which are especially preferred, are commercially available, for example from Rohm and Haas as Amberlite IRA-93 and Stratabed 93 and from Dow Chemical Company as Dowex 3 and Dowex WGR. Gel type weak base anion exchange resins, which can be used herein, are also commercially available from Rohm and Haas as Amberlites IR-45, IR-47 and IR-68 and are also available from Dow. The strong base ion exchangers, i.e., those having quaternary ammonium functionality, can also be used in this invention and these include Rohm and Haas' gel-type Amberlites IRA-400, IRA-400C, IRA-401S, IRA-402, IRA-410, IRA-425 and IRA-458 and Stratabed 402. Macroreticular strong base ion exchangers that can be used include Rohm and Haas' Amberlites IRA-900, IRA-900C, IRA-904, IRA-910, IRA-911, and IRA-938. Any of the weak base or strong base anion exchange resins described in "Ion Exchange Technology", F. C. Nachod and J. Schubert, Editors, Academic Press, New York, 1956, and "Ion Exchange Resins", Robert Kunin, Robert E. Krieger Publishing Company, Huntington, N.Y., 1972, can be used.

In summary, the operation of an ion exchange resin bed according to this invention comprises the following steps: (1) Backwashing, (2) Regeneration, and (3) Exhaustion, which are preferably used in this invention.

1. Backwashing - This is accomplished by reversing the flow of liquid (usually water) through the column. This step rinses out any sediment trapped among the resin beads and it allows the beads to re-settle, thus alleviating any pressure built up in the column due to expansion and contraction of the resin.

2. Regeneration - (a) The regeneration is simply a reverse shift in the reaction equilibrium due to the passage of a suitable concentrated ionic specie through the resin. As an example, assuming the resin is in the heat stable salt form, represented by $(R^+)_2HSS^=$, and it is being regenerated to the hydroxyl form, $R^+OH^-$, with a concentrated caustic solution. This can be represented by the following reaction:

$$(R^+)_2HSS^= + 2NaOH \rightleftharpoons 2R^+OH^- + Na_2HSS$$

(b) Thereafter, the hydroxyl form of the resin is converted to the bisulfite form by reaction with aqueous $SO_2$, i.e., $HSO_3^-$ ions as represented by the formula:

$$R^+OH^- + H_2SO_3 \rightleftharpoons R^+HSO_3^- + H_2O$$

3. Exhaustion - This is the part of the cycle where the unwanted anions, such as $HSS^=$, are removed from the solution and replaced with acceptable anions from the resin. In the case of triethanolamine (TEA) solvent system, this can be represented as follows:

$$2R^+HSO_3^- + (TEAH^+)_2HSS^= \rightleftharpoons (R^+)_2HSS^= + 2TEAH^+HSO_3^-.$$

A rinse step is used to wash from the resin the excess regenerant (e.g., NaOH or ammonia or other inorganic hydroxide) after regeneration step (a) and aqueous sulfur dioxide after regeneration step (b) and waste material from the resin. This usually requires large quantities of water which are disposed of by appropriate means as described hereinafter. A rinse step is also used after the exhaustion step to minimize loss of absorbent which is recovered in the rinse water.

A single bed or column of anion exchanger or a plurality of beds or columns thereof can be used. Each bed, of course, must be taken out of service periodically for regeneration. If one bed is used, the purge stream is continuously removed and stored while reclaimed absorbent (reclaimed by previous anion exchange resin treatment) is fed back into the system as make-up. Periodically, for example, once a day, the stored purge stream is reclaimed and the reclaimed solvent is stored and gradually fed back into the system to continuously make up for the purge stream continuously removed. After the stored purge stream has been reclaimed by anion exchange treatment, there remains ample time for the regeneration of the bed before the next reclamation operation.

For continuous anion exchange operation, it is necessary to have at least two anion exchange resin beds, one or more in anion exchange operation reclaiming absorbent while one other is being regenerated. The use of multiple ion exchange resin columns or beds joined in series is preferred and it is most preferred to have four series-connected beds in anion exchange operation while one or more others are being regenerated. By series connection, is meant that the output of the first bed is fed as input to the second bed, the output of the second bed is fed as input to the third bed and the output of the third bed is fed as input to the fourth bed. The input to the first bed, of course, is the aqueous absorbent purge stream and the output of the fourth bed is returned to service in the absorption of $SO_2$ from the waste gas.

The ion exchange resin beds or columns are operated under the best conditions for ion exchange. Ambient temperatures and pressures are usually acceptable, for example, room temperature and existing pressure of the atmosphere can be used. The fluids coming into contact with the beds or columns can be preheated or precooled as desired or necessary to provide the desired contact temperatures.

It is important that the absorbent purge stream and wash, rinse and regeneration fluids passed through the anion exchange resin bed or column be of sufficiently low density so as not to float off the resin or otherwise disrupt the bed. The densities of fluids coming into contact with the bed can be lowered by dilution with water. For example, the incoming absorbent purge stream if of too high a density can be diluted with water, for example, the wash water obtained by washing the bed or column with water after contact with the absorbent purge stream.

The preferred form of the present invention is also based on the fact that weak base resins (Rohm and Haas Amberlite IRA-93 or IR-45 or Dow Chemical Co. Dowex 3 and equivalent) are characteristically easier to regenerate than the strong base resins. Considering the two fundamental reactions in a typical anion exchange in which $R^+$ stands for the cationic group (polyfunctional amine or quaternary ammonium) affixed to the resin matrix and $X^-$ stands for any anion, the exhaustion step:

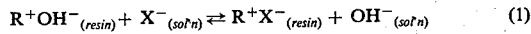   (1)

and the regeneration step:

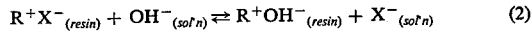   (2)

it can be said that, for strong base resins, reaction (1) proceeds readily to the right, whereas reaction (2) proceeds with difficulty, typically requiring a large excess of strong caustic to drive it to completion. With weak base resins on the other hand, reaction (2) proceeds readily while reaction (1) cannot be easily driven to completion. Weak base resins are principally used for the deionization of acid waste waters (e.g., dilute citric acid) in which reaction (1) is driven to the right by the simultaneous neutralization reaction

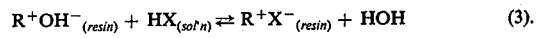   (3).

It has been found that, while the strong base resin Amberlite IRA-910 (Rohm and Haas) required the passage of an amount of 10% NaOH equivalent to three times the resin bed exchange capacity for its complete regeneration, the weak base resin Amberlite IRA-93 (Rohm and Haas) could be completely regenerated by passage through the resin bed of an amount of aqueous ammonia (2.5–5.0 molar) equivalent to one and a half times the resin exchange capacity. However, the weak base resin in the hydroxyl form proved less efficient for the removal of heat stable salts, typically 25% of the heat stable salts being removed when an amount of solvent containing heat stable salts equivalent to 58% of the bed exchange capacity was passed through the bed. Thus, though ammonia is usually less expensive than caustic both on a weight basis and especially on a molar basis, the advantages of using the weak base, ammonia-regenerated resins still left room for further improvement.

For the purposes of absorbent regeneration, it is not necessary to entirely deionize the absorbent reclamation stream, but merely to remove the heat stable salts. These could be replaced by sulfite or bisulfite as well as by the hydroxyl ion. Attempts were made to regenerate the weak base resin using aqueous sodium sulfite or bisulfite directly, in an effort to take advantage of the selectivity of ion exchange resins for dinegative ions over uninegative ions. The heat stable salts (collectively designated HSS) exist in the absorbent primarily in the dinegative anionic forms $SO_4^=$, $S_2O_3^=$, $S_2O_6^=$, etc., collectively designated $HSS^=$. This selectivity is exemplified by

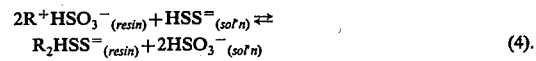   (4).

However, even a ten-fold excess of sodium bisulfite was inadequate to completely regenerate the resin loaded with heat stable anions as demonstrated by the decreasing removal of heat stable salts on repetitions of the cycle sodium bisulfite, water, absorbent, water, sodium bisulfite, and so forth.

The inefficiency of the sodium bisulfite regeneration step might be overcome by increasing the concentration of the bisulfite in the regenerant solution, i.e., to overwhelm the reaction by mass action. However, the regenerant solution must be kept less dense than the resin (1.04 g/cc) to avoid flotation of the resin beads and column disruption. The use of lighter cations than sodium in the bisulfite regenerant stream ($NH_4^+$, $Li^+$, $H^+$) helps to avoid resin bead flotation and column disruption. There is available, as a waste product of the overall process, aqueous sulfur dioxide, which can be obtained at any desired concentration (i.e., density) by the judicious choice of the pressure at which water is saturated with it. The aqueous sulfur dioxide was discovered to be effective in a two-step regeneration procedure. Thus, the resin is first converted to the hydroxyl form using aqueous ammonia and then is converted to the bisulfite form by contact with aqueous sulfur dioxide. The resin in the bisulfite form is then contacted with the absorbent stream, heat stable salts being readily replaced in solution by bisulfite ions. The divalent heat stable salts now attached to the resin, together with residual bisulfite, is displaced with aqueous ammonia, preparing the resin for another cycle of contact with aqueous sulfur dioxide, wash, and contact with absorbent containing heat stable salts.

Each stream that is passed through the ion exchange bed is preferably followed by a water wash step to prevent cross contamination of process streams. This increases the quantity of more or less contaminated waste streams. However, this difficulty is readily overcome. For instance, in regenerating the exhausted resin bed (after water-washing) with excess ammonia, the ammonia stream first displaces a free column volume of substantially uncontaminated water which can be returned to the water reservoir or used elsewhere in the process. The tail cut from the ammonia stream contains substantially uncontaminated aqueous ammonia (with traces of bisulfite and heat stable salts). Because of the enormous affinity of the resin for hydroxyl ion, these extraneous salts in the ammonia tail cut can be returned to the ammonia reservoir in which extraneous salts reach a small and innocuous steady state concentration. Likewise, when the aqueous sulfur dioxide solution is passed through the resin bed in the hydroxyl form, the first effluent is substantially uncontaminated water which can be reused subsequently for washing the resin or elsewhere in the process. The tail cut contains water and sulfur dioxide which can be returned to the sulfur dioxide reservoir for subsequent use in regenerating the resin. The absorbent stream containing heat stable salts again displaces a column volume of substantially uncontaminated water which again is returned to the water reservoir for subsequent resin washing or otherwise employed in the process. The remainder of the absorbent stream, now depleted in heat stable salts, is returned to the absorption-stripping cycle of the process.

The present invention is advantageously applied to a continuous process for the selective removal of sulfur dioxide with respect to carbon dioxide from a gas mixture such as a waste combustion gas containing same wherein the gas mixture is contacted with a mainstream of an aqueous absorbent solution to remove sulfur dioxide from the gas mixture and form a mainstream of rich aqueous absorbent solution enriched in sulfur dioxide removed from the gas mixture; the mainstream of the rich aqueous absorbent solution is moved to a stripping zone where it is stripped of sulfur dioxide to form a mainstream of lean aqueous absorbent solution depleted in sulfur dioxide content; and the mainstream of the lean aqueous absorbent solution is recycled and re-contacted with the gas mixture in the absorbing zone. The improvement of this invention is employed in this context for removing divalent sulfur oxyanions of heat stable salts which accumulate in the absorbent solution by separating a portion of the aqueous absorbent solution containing the divalent sulfur oxyanions of heat stable salts as a slip stream or purge stream from one of the mainstreams (rich aqueous absorbent mainstream being preferred), contacting the slip stream with an anion exchange resin having bisulfite anions displaceable by the divalent sulfur oxyanions of the heat stable salts to remove same from the separated slip stream whereby the bisulfite anions of the resin are replaced by the divalent sulfur oxyanions of the heat stable salts; returning the separated slip stream after contact with the anion exchange resin to one of the mainstreams, and regenerating the anion exchange resin by contacting it with aqueous ammonia or other inorganic hydroxide, such as the alkali metal hydroxides including sodium hydroxide and potassium hydroxide (aqueous ammonia being preferred) to replace the divalent sulfur oxyanions of the heat stable salts on said resin with hydroxyl anions thereby forming a waste stream containing the divalent sulfur oxyanions of the heat stable salts, and thereafter contacting the resin with aqueous sulfur dioxide to replace the hydroxyl anions with bisulfite anions.

The volume fraction of the circulating absorbent (in the absorption-stripping cycle) which is diverted to the absorbent reclamation step is directly proportional to the rate of heat stable salt generation and absorption in the circulating absorbent and inversely proportional to (a) the desired ratio of heat stable salts to achieve absorbent tolerable or acceptable in the circulating absorbent and (b) to the fraction of the heat stable salts present in the slip stream which is removed for reclamation. The volume fraction of the circulating absorbent diverted as the slip or purge stream to the absorbent reclamation step (i.e., contact with the weak base anion exchange resin) is about 2 to about 20 volume percent, preferably about 5 to about 8 volume percent, and can be more or less depending upon particular conditions. It is preferred to maintain the volume fraction of circulating absorbent diverted as the slip or purge stream as low as possible to minimize absorbent losses in the wash water of the resin regeneration step not recirculated to the purge stream for density adjustment. It is desirable, of course, to conduct the overall process in such a manner that heat stable salt formation and accumulation is minimized.

It is preferred to remove for reclamation a purge stream from the rich absorbent stream on its way from the absorber to the stripper because the ion exchange resin used for reclamation is in the bisulfite form. Its capacity for selectively picking up the heat stable salt content of the lean purge stream is slighly hampered by the sulfur dioxide content which is primarily in the form of sulfite ions in the lean purge stream in which case the divalent sulfite ions compete to a certain extent with the divalent heat stable salt anions. The absorbent purge stream removed for reclamation can be taken from the lean absorbent leg or the rich absorbent leg of the absorption-stripping cycle whichever is most convenient or otherwise most advantageous. A particularly advantageous procedure in some instances is to take a purge stream of the rich absorbent coming from the absorber and to contact it with incoming waste gas before sending it to the ion exchange resin. In this way the incoming waste gas is quenched to a more desirable absorption temperature and humidified or dehumidified to the desired moisture content while the absorbent purge stream picks up sulfur trioxide and acid mist from the waste gas to reduce the formation and accumulation of heat stable salts in the absorption-stripping cycle and, at the same time, gives up some of its sulfur dioxide content to the waste gas for removal and concentration in the absorption-stripping cycle.

The waste stream produced by treating the exhausted anion exchange resin (loaded with heat stable anions) with ammonium hydroxide contains the heat stable salt anions, water, some ammonia and some $SO_2$. It is preferred to recover the ammonia and water and remove the $SO_2$ for concentration in the absorber-stripping cycle and at the same time to further concentrate the waste stream containing the HSS= to simplify disposal thereof. This can be accomplished by contacting the incoming waste gas with the waste stream whereupon sulfur trioxide and acid mist are absorbed in the waste stream and $SO_2$ is displaced to the waste gas.

It is also preferred to increase residence time of the rich absorbent in the absorbent stripper as much as practical. However, inasmuch as the increase of residence time also increases heat stable salt formation, the residence time should not be increased to such an extent that excessive amounts of HSS= are formed. This can be done in a number of ways one of which is to enlarge the stripper boiler or evaporator to provide a high holdup to throughput ratio. Another way of increasing residence time is to use conventionally sized equipment and to recirculate the absorbent being stripped through an external circulation loop containing an amply sized reservoir so that the total holdup time in the stripper and its circulation loop is adequate to provide the desired high residence time.

The techniques and procedures described in concurrently filed application Ser. No. 781,166, by Alexander J. Kosseim, D. A. Dunnery and Gilbert R. Atwood can be employed in the process of this invention and the disclosure of said application is incorporated herein by reference.

BRIEF DESCRIPTION OF THE DRAWING

The single FIGURE is a flow diagram illustrating one embodiment of the invention.

DESCRIPTION OF SPECIFIC EMBODIMENTS

The present invention comprises also several steps directed toward the economical removal of HSS= from the absorbent of a regenerable process for sulfur dioxide-removal from waste gases, e.g., stack gases. While primarily aimed at such HSS= removal in a process involving the use of aqueous alkanolamines as absorbent, it is not limited thereto and could find application in wholly inorganic sulfur dioxide removal systems. The amount of water in the aqueous absorbent can be about 5 to about 50 wt.%, preferably about 10 to about 40 wt.%. Higher or lower amounts can be used, if desired. It is to be understood that one or more of the steps of the embodiment of this invention given hereinafter might be altered or deleted depending upon the temperature, pressure and composition of the feed gas; specific requirements the process must meet; the relative costs of steam, chemicals and capital investment, and other factors. In a full embodiment the invention comprises the steps of:

(a) Absorbing sulfur dioxide from a waste gas into an absorbent, preferentially aqueous alkanolamine, such absorption to be carried out at or near atmospheric pressure (or above if the feed gas is so available) at about 20° to about 70° C. temperature. The lower temperatures increase absorption efficiency and decrease HSS= formation in the absorber.

(b) Diverting from the absorbent a fraction of absorbent containing dissolved sulfur dioxide and HSS.

(c) Conducting the absorbent, with or without prior dilution with water to adjust density, if needed, and with or without prior cooling, to a quench tower in which the feed gas is cooled, absorbs or desorbs water and gives up sulfur trioxide/sulfuric acid mist to the absorbent displacing therefrom sulfur dioxide.

(d) Contacting the absorbent purge stream, now depleted in sulfur dioxide and enriched in sulfuric acid with one or more columns of an anion exchange resin (preferably weak base originally in the bisulfite form.)

(e) The resin bed absorbs sulfate and other heat stable sulfur oxyanions from the absorbent solution, replacing the heat stable salts in the absorbent solution with bisulfite anions. The column is then water-washed and the effluent is used as a source of water make-up in the process.

(f) Removing the resin bed, or the most exhausted member of a series of resin beds, from service and contacting it with a stream of aqueous ammonia (2–10 molar) equivalent to between one and three times the resin exchange capacity of the bed.

(g) Diverting the ammonia effluent or the portion thereof richest in heat stable salts to waste or to a quench tower to cool and humidify the waste gas prior to being treated in Step a) above and to absorb $SO_3$/acid mist and desorb $SO_2$.

(h) Returning the ammoniacal effluent or the portion thereof poorest in heat stable salts to ammonia storage.

(i) Water-washing the column last treated with ammonia and returning the effluent therefrom to ammonia storage or water storage.

(j) Treating, after water-washing in Step i), the column with aqueous sulfur dioxide which converts the resin to the bisulfite form, followed by water-washing, and then returning part of the aqueous sulfur dioxide water-wash stream to the aqueous sulfur dioxide reservoir.

(k) Returning the column, after sulfur dioxide treatment and water-washing, to absorbent contact or placing it at the tail end of a train of columns destined for absorbent contact.

(l) Returning the reclaimed absorbent stream exiting the resin column or exiting the last resin column in the column train to the circulating absorbent.

(m) Using the water-wash stream from the column about to be ammonia treated to dilute the incoming purge stream of absorbent of Step c).

(n) Desorbing of the $SO_2$ from the absorbent resulting from Step a) by steam-stripping in a single stage still or an evaporator providing a liquid residence time of about 3 to about 30 minutes, preferably about 10 to about 15 minutes, and operated at a reduced pressure of about 50 to about 350 mm Hg, preferably about 100 to about 150 mm Hg, and a temperature of about 80 to about 100° C. The lower temperatures decrease HSS= formation in the stripper.

(o) Removing the $SO_2$ overhead from Step n), condensing the water therefrom, compressing the $SO_2$ to atmospheric pressure or above for further use or storage and/or using part of this $SO_2$ to make aqueous sulfur dioxide required in Step j).

(p) Recirculating the stripped absorbent back to the absorber.

Temperatures and pressures above and below those specified in the above steps can be employed if desirable or advantageous.

The following examples are presented. In the examples, the following designations have the meanings given below:

| | |
|---|---|
| cc | cubic centimeter |
| g | grams |
| wt. % | weight percent |
| meq | milliequivalent |
| ml | milliliter |
| M | molar |
| M lb mols | thousand pounds mols |

-continued

| | |
|---|---|
| ppmv | parts per million based on volume |
| ppm | parts per million based on weight |
| TEA | triethanolamine |
| HSS | heat stable salts having divalent sulfur oxyanions, e.g., $SO_4^=$, $S_2O_3^=$, $S_xO_6^=$ and the like, as described hereinabove. |

Also, unless otherwise specified all parts and percentages are on a weight basis, and all temperatures are on the Fahrenheit scale.

EXAMPLE 1

A column was prepared using Rohm and Haas Amberlite IRA-93 resin, a weak base, macroreticular styrene-divinylbenzene anion exchange resin having polyamine functionality, an apparent density (wet) of 0.61 g/cc, a true density (wet) of 1.04 g/cc, a moisture content of 46 to 54 wt. % and a total exchange capacity of 1.25 meq/ml (wt). The resin bed contained approximately 200 cc of resin (1¼ inches I. D. × 10 inches long). A solution of 10 molar aqueous ammonia was passed through the column and the column was then water-washed to remove excess ammonia. A liter of 1.05 M aqueous sulfur dioxide (prepared by sparging sulfur dioxide into water) was passed through the column, converting the resin to the bisulfite form. The column was again water-washed. A 176 cc volume of solvent containing triethanolamine, sulfur dioxide and heat stable salts having the composition given in Table 1 below was passed through the column and water was then passed through the column to remove the remaining solvent. The resulting treated solvent plus water-wash totalled 320 cc and had the composition given in Table 1 below. The total heat stable salts measured as $H_2SO_4$ and $H_2S_2O_3$ in the solvent prior to treatment amounted to 8.44 g and after treatment amounted to 4.29 g indicating that 4.15 g (49 wt.%) had been removed by the treatment. This demonstrated the practicality of the treatment.

TABLE 1

| | Solvent Prior to Treatment | | Solvent After Treatment* | |
|---|---|---|---|---|
| Volume | 176 | cc | 320 | cc |
| Specific Gravity | 1.132 | g/cc | 1.072 | g/cc |
| pH | 4.4 | | 4.6 | |
| Wt. % $H_2O$ | 63.6 | | 78.8 | |
| Wt. % TEA | 25.9 | | 14.4 | |
| Total TEA, g | 51.6 | | 49.4 | |
| Wt. % $SO_2$ | 4.84 | | 4.06 | |
| Total $SO_2$, g | 9.64 | | 13.93 | |
| Wt. % $H_2SO_4$ | 1.91 | | 0.98 | |
| Total $H_2SO_4$, g | 3.80 | | 3.36 | |
| Wt. % $H_2S_2O_3$ | 2.33 | | 0.27 | |
| Total $H_2S_2O_3$, g | 4.64 | | 0.93 | |

*plus water wash

EXAMPLE 2

FIG. 1 represents the process of this invention as applied to the flue gas of an 800 megawatt power plant burning coal containing 3 wt.% sulfur. The flue gas feed, which has been passed through an economizer (not shown), and from which 99% of the fly ash has been mechanically removed, is represented by stream 1, which typically consists of about 248 M lb mols/hr of gas at about 300° F., containing approximately 120 ppm $SO_3$/acid mist, 2000 ppm $SO_2$ and 4 vol % $H_2O$. Its further approximate composition is given in Table 2 as are the approximate compositions of the process streams hereinafter described.

TABLE 2

| Stream No. | Description | Total Flow | Inerts* | $NO_2$ | HSS** | $SO_2$ | $H_2O$ | TEA | $NH_3$ | Temp. (° F) |
|---|---|---|---|---|---|---|---|---|---|---|
| | | Flow given in 1000 pound mols/hr. | | | | | | | | |
| 1 | Flue Gas Feed | 247.87 | 237.17 | 0.0115 | 0.03 | 0.4837 | 10.17 | | | 300 |
| 15 | Absorber Vent | 252.37 | 237.17 | 0.008 | | 0.026 | 15.17 | | 0.2651 | 120 |
| 13 | Purge Stream | 1.3325 | | 0.0020 | 0.0530 | 0.1449 | 0.8675 | 0.2651 | | 120 |
| 33 | Dilute Purge Stream | 5.8367 | | 0.0020 | 0.0624 | 0.1729 | 5.2875 | 0.3119 | | 70 |
| 20 | Absorbent Wash To Dilute Purge | 4.5042 | | | 0.0094 | 0.0280 | 4.4200 | 0.0468 | | 70 |
| 23 | Regenerated Absorbent | 6.5504 | | | 0.0374 | 0.1841 | 6.0700 | 0.2589 | | 70 |
| 53 | Ammonia Make-Up | 0.5891 | | | | | 0.4113 | | 0.1778 | 70 |
| 46 | Recycled Ammonia | 1.4297 | | | | | 1.4203 | | 0.0094 | 70 |
| 37 | Ammonia To Ion Exchange 34 | 2.0188 | | | | | 1.8316 | | 0.1872 | 70 |
| 29 | $SO_2$ Make-Up | 0.2439 | | | | 0.1279 | 0.1160 | | | 70 |
| 52 | Recycled Sulfurous Acid | 8.7844 | | | | 0.0593 | 8.7251 | | | 70 |
| 38 | Sulfurous Acid To Ion Exchange 34 | 9.0283 | | | | 0.1872 | 8.8411 | | | 70 |
| 49 | Recycled $H_2O$ | 5.2025 | | | | | 5.2025 | | | 70 |
| 39 | Total $H_2O$ To Ion Exchange 34 | 18.2883 | | | | | 18.2883 | | | 70 |
| 2 | Waste Stream (liquid) | 8.6985 | | 0.0020 | 0.0156 | 0.0863 | 8.4106 | 0.0062 | 0.1778 | 70 |
| 6 | Gas To Quench Tower 8 | 252.85 | 237.17 | 0.0115 | 0.0182 | 0.4837 | 15.1694 | | | 120 |
| 10 | Gas To Absorber 11 | 252.87 | 237.17 | 0.0115 | | 0.52 | 15.17 | | | 120 |
| 19 | Rich Absorbent From Absorber 11 | 10.40 | | 0.0154 | 0.2678 | 1.394 | 6.68 | 2.04 | | 120 |
| 24 | Lean Absorbent From Stripper 14 | 9.90 | | 0.0119 | 0.2678 | 0.90 | 6.68 | 2.04 | | 190 |
| 9 | Purge Stream To Quench Tower 8 | 1.351 | | 0.002 | 0.0348 | 0.1812 | 0.8681 | 0.2651 | | 120 |
| 22 | Rich Absorbent To Stripper 14 | 9.046 | | 0.0134 | 0.2330 | 1.2128 | 5.8119 | 1.7749 | | 120 |

*Includes $N_2$, $O_2$, CO, $CO_2$ and NO
**Calculated as HSS anions ($SO_4^=$, $S_2O_3^=$, $S_xO_6^=$)

Stream 1 can be depleted of most of its $SO_3$/acid mist content and conditioned to the desired dew point and absorption column temperature by circulating the waste stream 2 from the ion exchange resin bed to be described hereinafter through quench tower 3. The waste stream 2 is recirculated as stream 4 through cooler 5 and reintroduced to the top of quench tower 3 as the quench media. The gas stream 6 exiting tower 3 is now at about 120° F. temperature and contains approximately 6.0 vol % $H_2O$ and 80 ppm $SO_3$/acid mist. Simultaneous with cooling and humidifying (or drying) the gas, the latter has also been somewhat depleted of particulate matter or fly ash and of $SO_3$/sulfuric acid mist. There are many advantages to using waste stream 2, instead of process water, in the quench tower 3: (a) the overall water requirement for the process is thereby reduced, (b) the ammonia present in waste stream 2 enhances the removal of $SO_3$ from the gas stream 1 and neutralizes it, and (c) waste stream 7 which exits the quench tower 3 is now at a higher temperature and has a smaller volume than the inlet waste stream 2.

The cool gas stream 6 enters the base of a second quench tower 8, wherein it flows countercurrently to a purge stream 9 containing TEA from the bottom of an absorber tower 11. Purge stream 9 further reduces the $SO_3$/acid mist content of the gas stream to almost nil before it enters as stream 10 into the base of the absorber tower 11. The purge stream 9 is recirculated as a stream 12 through quench tower 8, wherein its HSS content increases from about 0.26/1 to 0.40/1 of TEA tied up with HSS/total TEA in the stream on a weight basis; and it simultaneously releases part of its $SO_2$ content to the gas stream 10. Among the many advantages of this step are: (a) increasing the HSS level in the purge stream 13 emanating from the loop of the second quench tower 8, to be treated by the ion exchange treatment described hereinafter, which results in a higher chemical efficiency and thus reduces costs, and (b) a smaller volume of recirculating solvent is required between the absorber 11 and sulfur dioxide stripper 14 as described hereinafter which results in smaller equipment size and reduced costs.

The pretreated gas stream 10 enters the base of the absorber 11 wherein it flows countercurrent to the downcoming TEA and its $SO_2$ content is reduced from about 2000 ppm to about 100 ppm (more or less as is required to meet pollution restrictions). The $SO_2$-depleted gas exits as stream 15 from the top of the absorber 11 and is sent to the stack with or without an intermediate reheating step as may be desired. Lean TEA absorbent stream 16, which has been cooled to approximately 120° F. and to which any necessary make-up solvent has been added via line 17 from TEA make-up tank 18 is fed into the top of the absorber 11. It passes downward, countercurrent to the gas stream, during which time it picks up $SO_2$, increasing its loading from about 0.2 to about 0.8 mol $SO_2$ per mol of triethanolamine sulfite.

The rich TEA absorbent stream 19 which exits the bottom of the absorber 11 is divided into two streams. One stream 9 circulates to the second quench tower 8 and, after being enriched with $SO_3$/acid mist, it emanates from quench tower 8 as purge stream 13 which is diluted with water to the desired density (suitable for contacting the anion exchange resin bed described hereinafter) with a portion of absorbent wash stream 20 to be described hereinafter and is sent to purge absorbent reservoir 21 for reclaiming with respect to HSS. The second stream 22 is joined by regenerated absorbent recycle stream 23 and enters the $SO_2$ stripper 14 which is a thin-film evaporator where water and $SO_2$ are evaporated at 100 mm Hg and 90° C. in a ratio of approximately 7 lbs $H_2O$ per lb $SO_2$. The lean absorbent 24 which exits the stripper 14 is sent back to the absorber 11 top after being heat exchanged and cooled (not shown) to the desired absorption temperature.

The $H_2O/SO_2$ overhead stream 25 from the $SO_2$ stripper 14 passes through condenser 26 and thence into separator 27 from which the $SO_2$ stream 28 can be pumped to storage or to any desired sulfur recovery step where it can be converted to a commerical grade of sulfur or concentrated sulfuric acid or otherwise used. A slip stream 29 of $SO_2$ and a water condensate stream 30 are sent respectively to the sulfurous acid reservoir 31 and to the water reservoir 32 where they are used in the reclaiming step described hereinafter.

A purge absorbent stream from purge absorbent reservoir 21 is filtered to remove any fly ash which may have bypassed initial mechanical removal and been entrapped in the absorbent. The filtrate is then passed via line 33 through one or more anion exchange beds 34 containing weak base anion exchange resins such as Rohm and Haas IRA-93 to remove about 40% of the HSS anions from the absorbent, replacing them with an equivalent amount of bisulfite anions from the resin. The regenerated absorbent, now depleted in HSS and diluted with water, is passed into reservoir 35 from which it is returned as regenerated absorbent stream 23 to the $SO_2$ stripper 14, to provide additional stripping water, after being mixed with the rich solvent stream 22.

While one or more anion exchange beds 34 are being used for absorbent reclaiming, others are being regenerated by a two-step process which consists of (1) treatment with 2–10 molar aqueous ammonia solution from reservoir 36, via stream 37, to convert the resin to the hydroxyl form, and (2) treatment with aqueous sulfur dioxide from reservoir 31, via stream 38 to convert the resin from the hydroxyl form to the bisulfite form. After contact of the anion exchange beds with each of the three streams, aqueous absorbent purge stream 33, aqueous ammonia stream 37 and aqueous sulfur dioxide stream 38, a water-wash step is used to minimize contamination of individual process streams. The total wash water requirement is provided by stream 39 emanating from water reservoir 32.

The effluents from the ion exchange beds 34 are cut in such a way as to minimize cross-contamination of the respective streams and are sent to appropriate tanks comprising absorbent wash water tank 41, regenerated absorbent tank 35, aqueous ammonia tank 45, waste water tank 43, aqueous sulfur dioxide tank 51 and recycle water tank 48. The absorbent wash water stream 20 is returned to the process as a source of make-up water, where the bulk of it is mixed with stream 13 to dilute it to the proper density suitable for contacting the anion exchange resin beds 34, while the remaining portion of stream 20 is is returned to the water reservoir 32. The regenerated absorbent stream 23 is returned to the stripper 14 via line 55. The aqueous ammonia stream 46, which contains small amounts of bisulfite and HSS, is returned to the ammonia reservoir 36. Likewise, the essentially pure aqueous sulfur dioxide stream 52 and process water stream 49 are returned to reservoirs 31 and 32, respectively.

More specifically, the wash water effluent following contact of the anion exchange beds 34 with absorbent purge stream 33 is diverted via line 40 to regenerated absorbent wash tank 41 which supplies absorbent wash stream 20 used for the dilution purposes mentioned hereinabove. The effluent richest in heat stable salts resulting from treatment with aqueous ammonia (stream 37) is sent via line 42 to waste water tank 43 which supplies waste stream 2. The effluent poorest in HSS and richest in ammonia resulting from treatment with aqueous ammonia (stream 37) is sent via line 44 to ammonia wash tank 45 from whence it is returned as needed to aqueous ammonia reservoir 36 via line 46. The wash water effluent richest in ammonia resulting from washing after aqueous ammonia treatment is also sent to ammonia wash tank 45 and wash water effluent poorest in ammonia is sent via line 47 to recycle water tank 48 for recycling via line 49 to water reservoir 32. The effluent poorest in sulfur dioxide resulting from the initial stages of treatment with aqueous sulfur dioxide is sent to recycle water tank 48 and the effluent richest in sulfur dioxide is sent via line 50 to sulfurous acid wash tank 51 for recycle to sulfurous acid reservoir 31 via line 52. The wash water effluent richest in sulfur dioxide resulting from washing after aqueous sulfur dioxide treatment is sent to sulfurous acid wash tank 51 and effluent poorest in sulfur dioxide is sent to recycle water tank 48. Make-up ammonia is added through line 53 and make-up process water is added through line 54.

The aqueous waste stream effluent 2 which contains the heat stable anions removed from the absorbent, along with ammonia and sulfur dioxide, is sent to the quench tower 3 as previously described. The effluent 7 from tower 3 is a waste stream containing most of the $SO_3$/acid mist and the HSS, along with some bisulfite and ammonia, and leaves the system as the bottom product.

EXAMPLES 3, 4 AND 5

In each of these examples a column was prepared using Dowex WGR, a weak base anion exchange resin of the epoxy-amine type having predominantly tertiary amine functional groups and having a total exchange capacity as $H_2SO_4$ in the free base form of 1.6 meq/ml wet resin. This resin was found to have a greater selectivity for $SO_4^=$ anions over $S_2O_3^=$ anions as well as a higher capacity for HSS$^=$ than the resin used in Example 1. The Dowex WGR resin bed in each case contained about 50 cc (80 meq) of resin.

In each of Examples 3, 4 and 5, 250 ml of 5 M ammonium hydroxide was passed through the resin bed to convert the resin to the hydroxyl form. Thereafter, 250 ml of water was passed through the bed to wash the bed of excess ammonia. Then 200 cc (about 1.5 times resin equivalent) of 3 to 3.5 wt.% of aqueous $SO_2$ was passed through the resin bed to convert it to the bisulfite form. The bed was then thoroughly washed with 500 cc water (until pH test paper read 5 to 6).

Fully loaded triethanolamine absorbent containing triethanolamine bisulfite, triethanolamine sulfate triethanolamine thiosulfate and other heat stable salts of triethanolamine, but no free triethanolamine, was passed through the resin bed. In Examples 3 and 5, 40 mol % of the TEA was combined as total heat stable salts (i.e., as $SO_4^=$, $S_2O_3^=$ as well as all other heat stable salts) and in Example 4, 47 mol % of the TEA was combined as total heat stable salts. In each case, the composition of the absorbent is given in Table 3 as well as the amount of absorbent in SR value wherein:

$$SR = \frac{\text{Equivalents of resin capacity}}{\text{Equivalents of total salts in the absorbent}}$$

The bed was then washed with 500 cc of water.

Each resin bed was then eluted with 125 cc of 5M ammonium hydroxide followed by washing with 125 cc of water. The effluents from the ammonium hydroxide treatment and water wash were collected and analyzed. The analytical results are given in Table 3 wherein the percentages of sulfate and thiosulfate anions removed from the initial absorbent composition are given.

TABLE 3

| Ex. | SR | Initial Absorbent Composition, Mole Fractions Of TEA As | | | Mole % $SO_4^=$ And $S_2O_3^=$ Removed* | | Mole % Total** HSS Anions Removed |
|---|---|---|---|---|---|---|---|
| | | $HSO_3^-$ | $SO_4^=$ | $S_2O_3^=$ | $SO_4^=$ | $S_2O_3^=$ | |
| 3 | 0.63 | 0.62 | 0.24 | 0.14 | 61.86 | 79.68 | 70.07 |
| 4 | 0.44 | 0.59 | 0.29 | 0.12 | 43.11 | 58.33 | 46.37 |
| 5 | 0.20 | 0.62 | 0.24 | 0.14 | 18.75 | 38.93 | 30.23 |

*Based on mols of $SO_4^=$ and $S_2O_3^=$ respectively in initial absorbent composition
**Based on mols of total HSS anions in initial absorbent composition

What is claimed is:

1. In a process for the selective removal of sulfur dioxide with respect to carbon dioxide from a gas mixture containing same wherein
   (a) said gas mixture is contacted with an aqueous absorbent solution containing as an absorbent an alkanolamine, an alkali metal hydroxide, ammonium hydroxide, an alkanolamine sulfite, an alkali metal sulfite or ammonium sulfite to remove sulfur dioxide from said gas mixture and form a rich aqueous absorbent solution enriched in sulfur dioxide removed from the gas mixture,
   (b) said rich aqueous absorbent solution is moved to a stripping zone where sulfur dioxide is removed to form a lean aqueous absorbent solution depleted in sulfur dioxide content, and
   (c) said lean aqueous absorbent solution is recycled and re-contacted with said gas mixture,
the improvement comprising, contacting said aqueous absorbent solution with an anion exchange resin having bisulfite anions displaceable by said divalent sulfur oxyanions of heat stable salts to remove same from said aqueous absorbent solution whereby the bisulfite anions of the resin are replaced by said divalent sulfur oxyanions of heat stable salts.

2. Improvement as claimed in claim 1 wherein said anion exchange resin is a weak base anion exchange resin and is regenerated by contacting it with aqueous ammonium hydroxide to replace the divalent sulfur oxyanions of said heat stable salts on said resin with hydroxyl anions and thereafter contacting said resin with aqueous-sulfur dioxide to replace the hydroxyl anions with bisulfite anions.

3. In a process for the selective removal of sulfur dioxide with respect to carbon dioxide from a gas mixture containing same wherein
   (a) said gas mixture is contacted with a mainstream of an aqueous absorbent solution containing as an absorbent an alkanolamine, an alkali metal hydroxide, ammonium hydroxide, an alkanolamine sulfite, an alkali metal sulfite or ammonium sulfite to remove sulfur dioxide from said gas mixture and form a rich aqueous absorbent solution enriched in sulfur dioxide removed from the gas mixture, (b) a mainstream of said rich aqueous absorbent solution is moved to a stripping zone where it is stripped of sulfur dioxide to form a lean aqueous absorbent solution depleted in sulfur dioxide content, and (c) a mainstream of said lean aqueous absorbent solution is recycled and re-contacted with said gas mixture, the improvement comprising (1) separating a portion of said aqueous absorbent solution containing said divalent sulfur oxyanions of heat stable salts from one of said mainstreams, (2) contacting said separated portion with an anion exchange resin having bisulfite anions displaceable by said divalent sulfur oxyanions of heat stable salts to remove same from said portion whereby the bisulfite anions of the resin are replaced by said divalent sulfur oxyanions of heat stable salts, (3) returning said portion after contact with said anion exchange resin to one of said mainstreams, and (4) regenerating said anion exchange resin by contacting it with aqueous inorganic hydroxide to replace the divalent sulfur oxyanions of heat stable salts on said resin with hydroxyl anions thereby forming a waste stream containing said divalent sulfur oxyanions of heat stable salts, and thereafter contacting said resin with aqueous-sulfur dioxide to replace the hydroxyl anions with bisulfite anions.

4. Improvement as claimed in claim 3 wherein said anion exchange resin is a weak base resin.

5. Improvement as claimed in claim 4 wherein said removed portion is lean aqueous absorbent solution.

6. Improvement as claimed in claim 4 wherein said removed portion is rich aqueous absorbent solution.

7. Improvement as claimed in claim 4 wherein said inorganic hydroxide is ammonium hydroxide.

8. Improvement as claimed in claim 4 wherein said waste stream containing the divalent sulfur oxyanions of heat stable salts is contacted with said incoming gas mixture prior to its contact with said aqueous absorbent solution to absorb any sulfur trioxide and acid mist in said gas mixture.

9. Improvement as claimed in claim 4 wherein said separated portion is separated from the mainstream of rich aqueous absorbent solution and is contacted with said gas mixture at elevated temperature thus depleting the sulfur dioxide content in said separated portion.

10. Improvement as claimed in claim 7 wherein sulfur dioxide stripped in said stripping zone is used to regenerate the anion exchange resin and the water driven off in said stripping zone is used to wash said anion exchange resin during regeneration.

11. Improvement as claimed in claim 10 wherein said water driven off in the stripping zone is recovered and used to dilute said separated portion of aqueous absorbent solution.

12. Improvement as claimed in claim 4 wherein said separated portion is separated from the mainstream of lean aqueous absorbent solution and is contacted with said gas mixture before said gas mixture contacts the mainstream of said lean aqueous absorbent solution and before said separated portion contacts said anion exchange resin.

13. Improvement as claimed in claim 4 wherein said separated portion after contact with said anion exchange resin is returned to said stripping zone.

14. Improvement as claimed in claim 4 wherein said anion exchange resin is disposed in a plurality of columns connected in series and said separated portion of said aqueous absorbent solution is first contacted with anion exchange resin in a first column and lastly contacted with anion exchange resin in a last column before returning it to one of said mainstreams.

15. Improvement as claimed in claim 14 wherein said anion exchange resin is disposed in four columns connected in series.

16. Improvement as claimed in claim 14 wherein said regenerating step is carried out on said first column and a regenerated column containing anion exchange resin having bisulfite anions is added in series to said last column which thus becomes the next-to-last column and the newly added column becomes the last column.

* * * * *